United States Patent
Goyke et al.

(10) Patent No.: US 10,677,301 B2
(45) Date of Patent: Jun. 9, 2020

(54) DISC BRAKE, AND FLAT SPRING OF A HOLD-DOWN ASSEMBLY FOR THE BRAKE PADS OF A DISC BRAKE

(71) Applicant: BPW Bergische Achsen KG, Wiehl (DE)

(72) Inventors: Georg Goyke, Nümbrecht (DE); Fabian Köster, Bergneustadt (DE)

(73) Assignee: BPW Bergische Achsen KG, Wiehl (DE)

( * ) Notice: Subject to any disclaimer, the term of this patent is extended or adjusted under 35 U.S.C. 154(b) by 5 days.

(21) Appl. No.: 15/771,102

(22) PCT Filed: Oct. 17, 2016

(86) PCT No.: PCT/DE2016/100483
§ 371 (c)(1),
(2) Date: Apr. 26, 2018

(87) PCT Pub. No.: WO2017/071681
PCT Pub. Date: May 4, 2017

(65) Prior Publication Data
US 2018/0306257 A1    Oct. 25, 2018

(30) Foreign Application Priority Data

Oct. 27, 2015   (DE) ........................ 10 2015 118 291

(51) Int. Cl.
*F16D 65/097* (2006.01)
*F16D 55/226* (2006.01)
(Continued)

(52) U.S. Cl.
CPC ......... *F16D 65/0977* (2013.01); *F16D 55/22* (2013.01); *F16D 55/2262* (2013.01);
(Continued)

(58) Field of Classification Search
CPC .... F16D 55/22; F16D 55/2262; F16D 55/226; F16D 55/225; F16D 65/092;
(Continued)

(56) References Cited

U.S. PATENT DOCUMENTS

| 3,500,966 A | 3/1970 | Birge |
| 5,090,520 A * | 2/1992 | Gockel ................. F16D 55/226 188/264 G |

(Continued)

FOREIGN PATENT DOCUMENTS

| CN | 2577027 | 10/2003 |
| CN | 201 526 758 | 7/2010 |

(Continued)

OTHER PUBLICATIONS

EPO translation, DE 10 2007 041658, Mar. 2008. (Year: 2008).*
EPO translation, DE 10 2013 011671. (Year: 2015).*

*Primary Examiner* — Thomas J Williams
(74) *Attorney, Agent, or Firm* — Gudrun E. Huckett

(57) ABSTRACT

A disc brake has a brake disc and brake pads each having a pad back plate and mounted on opposite sides of the brake disc. A brake caliper engages over brake disc and brake pads. A pad hold-down device secures the brake pads and bears against pad back plates of the brake pads transversely to the brake pads. A flat spring bears against a side of the pad hold-down device facing away from the brake pads. The flat spring extends in longitudinal direction of the pad hold-down device. First and second spring abutments support first and second spring ends of the flat spring. The first spring abutment has a fastener extending transversely to pad hold-down device and to flat spring. The first spring abutment has a clip connected to the brake caliper by the fastener. The first spring end bears against an inner side of the clip facing the fastener.

12 Claims, 2 Drawing Sheets

(51) Int. Cl.
*F16D 55/2265* (2006.01)
*F16D 65/092* (2006.01)
*F16D 55/22* (2006.01)
*F16F 1/18* (2006.01)
*F16D 55/00* (2006.01)

(52) U.S. Cl.
CPC ..... *F16D 55/22655* (2013.01); *F16D 65/092* (2013.01); *F16D 65/097* (2013.01); *F16D 65/0973* (2013.01); *F16F 1/18* (2013.01); *F16D 2055/007* (2013.01)

(58) Field of Classification Search
CPC ............... F16D 65/0977; F16D 65/097; F16D 55/22655; F16D 65/0973
See application file for complete search history.

(56) References Cited

U.S. PATENT DOCUMENTS

| | | | |
|---|---|---|---|
| 5,496,080 A * | 3/1996 | Chabanne | B60N 2/01533 |
| | | | 292/252 |
| 9,726,243 B2 * | 8/2017 | Radhakrishnan | F16D 65/0977 |
| 2008/0067016 A1 | 3/2008 | Pritz et al. | |
| 2008/0289914 A1 * | 11/2008 | Trimpe | F16D 65/0977 |
| | | | 188/73.31 |
| 2009/0211857 A1 | 8/2009 | Camilo-Martinez et al. | |
| 2009/0236188 A1 | 9/2009 | Raffin et al. | |
| 2016/0123415 A1 * | 5/2016 | Brandl | F16D 55/224 |
| | | | 188/73.37 |
| 2017/0138426 A1 * | 5/2017 | Schoenauer | F16D 65/0978 |
| 2019/0017558 A1 * | 1/2019 | Schwarz | F16D 65/0978 |
| 2019/0040922 A1 * | 2/2019 | Schwarz | F16S 65/0977 |

FOREIGN PATENT DOCUMENTS

| | | | | |
|---|---|---|---|---|
| DE | 25 05 877 | | 8/1976 | |
| DE | 103 60 292 | | 7/2005 | |
| DE | 10 2005 045 877 | | 2/2007 | |
| DE | 10 2006 002 306 | | 8/2007 | |
| DE | 102007041658 A1 * | | 3/2008 | ......... F16D 65/0977 |
| DE | 20 2008 013 446 | | 5/2009 | |
| DE | 20 2011 103 246 | | 1/2012 | |
| DE | 10 2013 011 671 | | 1/2015 | |
| DE | 10 2013 011 672 | | 1/2015 | |
| DE | 10 2015 000 857 | | 8/2015 | |
| DE | 102017113384 A1 * | | 12/2018 | ........... F16D 55/226 |
| EP | 1 069 334 | | 1/2001 | |
| EP | 1 898 115 | | 3/2008 | |
| EP | 2 687 746 | | 1/2014 | |
| GB | 1425269 A * | | 2/1976 | ......... F16D 65/0977 |

* cited by examiner

DISC BRAKE, AND FLAT SPRING OF A HOLD-DOWN ASSEMBLY FOR THE BRAKE PADS OF A DISC BRAKE

BACKGROUND OF THE INVENTION

The invention relates to a disc brake having a brake caliper engaging over a brake disc and brake pads on both sides of the brake disc, a pad hold-down device which secures the brake pads to prevent them from falling out of the disc brake and which, in bearing against the pad back plates of both brake pads, extends transversely to the latter, and comprising a flat spring, which bears resiliently against the side of the pad hold-down device remote from the brake pads, which extends in the longitudinal direction thereof, and which is supported by its two spring ends in spring abutments, wherein a component of one of the spring abutments is a fastener, which extends transversely to the pad hold-down device and the flat spring.

The invention further relates to a flat spring of a hold-down assembly for the brake pads of a disc brake, having a contact site in the form of a bend or curvature of the flat spring arranged at a middle portion of the flat spring with the outer curvature side facing the brake pads.

The invention further relates to a clip and particularly a fastening clip for a hold-down assembly comprising a pad hold-down device and a flat spring.

In disc brakes having a brake caliper accommodating the brake pads in pad take-ups measures are required in order to secure the brake pads, to prevent them from falling out of the pad take-ups. For this purpose, the pad take-up is often bridged by a stable retaining clip, which extends transversely to the brake pads and is fixed by its ends to the brake caliper, as is the case, for examples in EP 1 069 334 B1, EP 2 057 384 B1, DE 10 2005 044 091 A1, DE 10 2005 045 877 B3, DE 20 2008 013 446 U1 or DE 10 2015 000 857 A1. A flat spring, which is supported by its spring ends against the pad back plate of each brake pad and in the area of its spring center against the retaining clip from beneath, is arranged between the retaining clip and each brake pad. This affords a constant hold-down force acting on the brake pads and directed towards the axis of rotation of the brake disc.

Since in the aforementioned disc brakes the springs supported on the brake pads are exposed to the heat from the brake pads and the brake disc, EP 2 687 746 B1 and EP 1 898 115 B1 disclose technical solutions in which there are no spring elements situated between the retaining clip, running transversely over the pad take-up, and the brake pads. Instead, a single flat spring is arranged on the outside of the rigid retaining clip and impinges on the latter with a spring force directed toward the brake pads. The retaining clip itself is therefore the pad hold-down device, for which purpose it bears directly against the upper edge of the back plates of the brake pads. The flat spring is supported in the area of its spring center against the top of the pad hold-down device remote from the brake pads, whilst its two spring ends are fixed in spring abutments on the brake caliper. A component of the one spring abutment is a fastener in the form of a bolt, which extends transversely to the pad hold-down device and the flat spring. The bolt serves both to lock the pad hold-down device and to fasten the flat spring. This double locking function performed by the use of the bolt leads to disadvantages in assembling the hold-down assembly, for instance after changing the brake pads because of wear.

The object of the invention is to improve and to simplify through technical measures the assembly of the hold-down assembly, for example, after changing the brake pads.

SUMMARY OF THE INVENTION

This object is achieved in a disc brake of the aforementioned type in that a further component of the spring abutment is a clip, which is connected to the brake caliper by the fastener, and against the inner side of which, facing the fastener, the spring end bears.

Although the clip constitutes an additional component within the hold-down assembly, it nevertheless improves and simplifies assembly of the functional unit comprising the pad hold-down device and the flat spring, namely with regard to the pre-tensioning action to which the flat spring is subjected during the assembly process and which is so detrimental from a technical assembly standpoint. Despite the pre-tensioning action to which the flat spring is subjected, the invention allows the fastener, preferably a bolt, to be mounted relatively easily and safely on the brake caliper so that both the pad hold-down device and the flat spring then assume their intended position.

Also contributing to the achievement of the stated object is the embodiment of the flat spring, when it is provided at its one spring end with an interlocking element extending substantially transversely to the main extent of the flat spring. The interlocking element serves to secure the flat spring in position in the area of the spring abutment comprising the bolt.

The flat spring is preferably provided at the spring end with a bend whose outer curved side is situated on the same main side of the flat spring as the outer curvature side at the contact site.

The flat spring is also preferably provided at its other spring end with an interlocking element extending substantially transversely to the main extent of the flat spring, wherein the two interlocking elements extend in opposite directions relative to the two main sides of the flat spring.

The interlocking element at the other spring end of the flat spring allows the flat spring to engage behind the pad hold-down device. A longitudinal coupling of this spring end to the pad hold-down device is thereby produced at this other spring end. In order to form the second interlocking element, the flat spring may be provided with a reduced taper compared to the rest of the flat spring width.

In a further embodiment, the flat spring bears resiliently against the pad hold-down device only at a single site over its longitudinal extent, wherein the flat spring at this site has a curvature, for example, in the form of a kink, and bears with the outer curvature side against the pad hold-down device.

According to a further embodiment, the pad hold-down device in the area of the spring abutment comprises two longitudinal portions, separated from one another by an open middle area and whose inner sides face one another, and a bearing bracket, which is formed on the brake caliper and to which the fastener is detachably fixed. In this case, it is advantageous when the clip is supported in the bolt longitudinal direction against the outer sides of the longitudinal portions facing away from one another.

Also contributing to the achievement of the stated object is the embodiment of the clip or fastening clip for use in the disc brake. It is integrally comprised of a middle portion and side portions angled in relation to the middle portion, wherein the side portions comprise apertures aligning with one another for passing through the fastener, preferably in the form of a bolt. The middle portion preferably comprises an aperture in the form of a slot extending toward the side portions.

BRIEF DESCRIPTION OF THE DRAWINGS

An exemplary embodiment of a disc brake with hold-down assembly is explained in more detail below, referring to the drawings. It is shown in.

DESCRIPTION OF PREFERRED EMBODIMENTS

Figure 1:
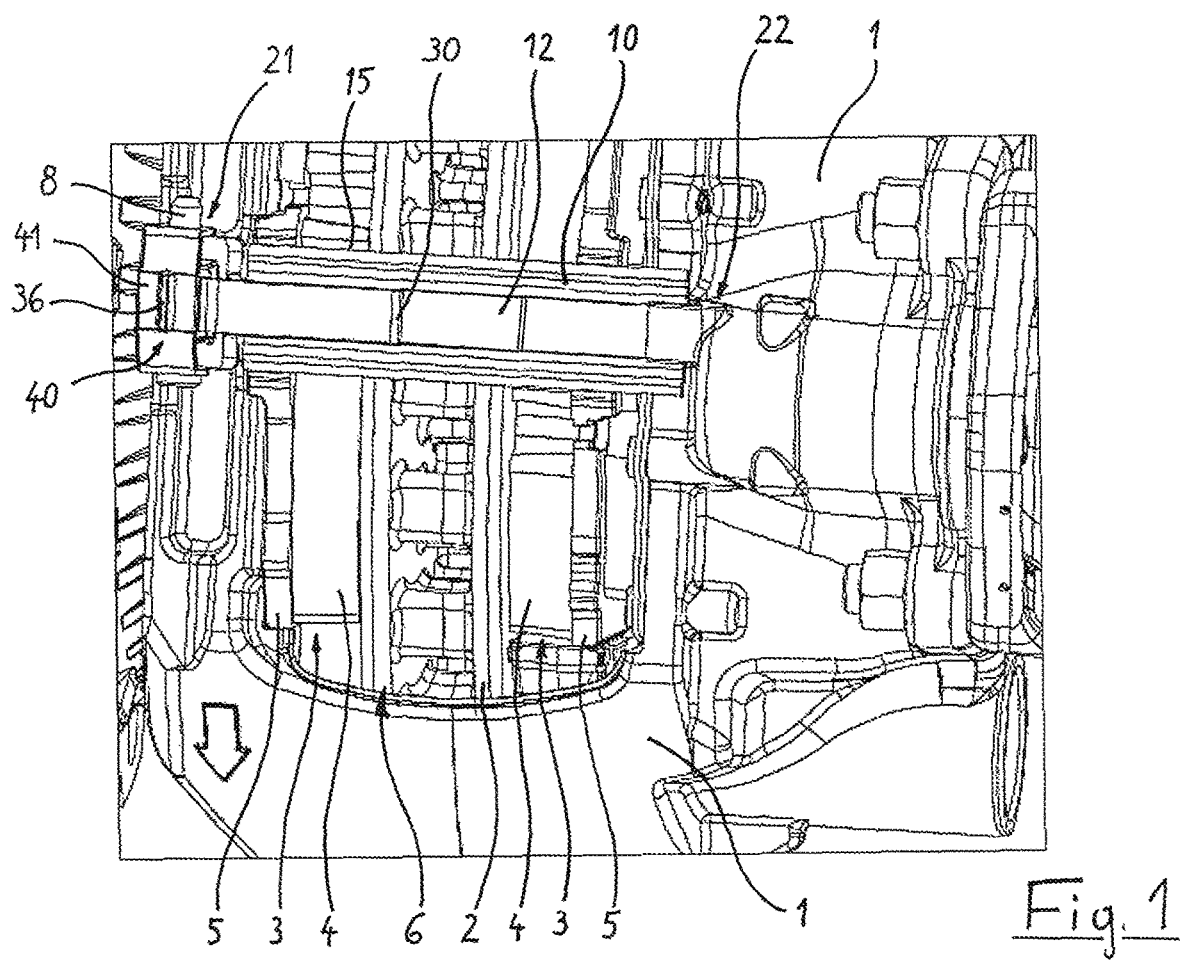
FIG. 1 a perspective top view of the central part of the brake caliper of a vehicle disc brake, including the pad take-up formed in the brake caliper in which brake pads are arranged on both sides of the brake disc.

FIG. 1 shows the central part of the brake caliper 1 of a vehicle disc brake for commercial vehicles. The disc brake may be of the floating-caliper type or the fixed-caliper type. A brake pad 3 is arranged on each side of the brake disc 2. The brake caliper 1 is provided with a pad take-up 6, over which a pad hold-down device 10 extends, for receiving the brake pads 3. The pad hold-down device 10 bridges the pad take-up 6 in such a way that the pad hold-down device 10 extends transversely to the brake pads 6.

The brake pads 3 as usual comprise the actual friction pad 4 and a pad back plate 5, which guides and supports the brake pads 3 on the brake caliper or on a brake carrier fixed to the axle.

The elongate pad hold-down device 10 extends parallel to the axis of rotation of the brake disc 2. The two ends thereof can be fixed directly or indirectly to the brake caliper 1. For this purpose, the one end of the pad hold-down device 10 projects under a recess 7 of the brake caliper 1 and is thus fixed directly to the brake caliper 1. The other end of the pad hold-down device 10 is detachably fixed to the brake caliper 1 by means of a fastener 8, in this case a cylindrical bolt.

For securing the two brake pads 3 in the pad take-up 6, the pad hold-down device 10 is embodied as a substantially rigid retaining clip and is combined with a flexurally elastic flat spring 12 to form a hold-down assembly.

The rigid pad hold-down device 10 has a cross section with an underside facing the brake pads 3, adjoined by bevels 15 toward both longitudinal edges, giving the pad hold-down device 10 an overall trapezoidal cross section in the area of its underside. The pad hold-down device 10 is supported only the bevels 15 on correspondingly chamfered contours, with which the pad back plates 5 are provided on their upper edges.

In this way, the pad hold-down device 10 fixes the brake pads 3 in the pad take-up 6 so that the brake pads 3 are not able to escape or fall radially out of the pad take-up 6, relative to the axis of rotation of the brake disc. The inclined arrangement of the bearing faces moreover also leads to a certain lateral securing of the two brake pads.

The pad hold-down device 10 has a cross section resembling a trapezoidal channel also remote from the brake pads 3. On both sides, bevels adjoin a flat base of this channel, which has a width approximating the width B of the flat spring 12.

The flat spring 12 composed of a spring steel is fixed by its one spring end 31 in a first spring abutment 21, and by its other spring end 32 in a second spring abutment 22, this fixing in each case being detachable in order to remove the flat spring 12 and the underlying pad hold-down device 10 and thereby access the pad take-up 6 in order to change the brake pads.

Outside, the flat spring extends along and parallel to the pad hold-down device 10 and is supported against the latter, so that the pad hold-down device 10 is spring-loaded towards the brake pads 3. In this way, the pad hold-down device, although in itself rigid, is supported under constant spring force directly against the outer edge of the pad back plate 5 of the two brake pads 3.

The flat spring 12 is not supported on the pad hold-down device 10 over its entire length but only at a very short contact site 35. In order to obtain this contact site 35, which is situated at a middle portion of the flat spring 12, the flat spring is provided with a bend or curvature 30. The curvature here is a bend, comparable to a kink, about a bending line that extends transversely to the longitudinal extent of the flat spring. With the outer side of this bend or curvature 30 the flat spring 12 bears directly on the base of the channel in the pad hold-down device 10. Therefore, the pad hold-down device 10 is subjected to the spring force acting towards the brake pads 3 only at the site of this discrete contact or support.

In the exemplary embodiment described here, the first spring abutment 21 is situated outwardly relative to the vehicle and the second spring abutment 22 inwardly relative to the vehicle on the brake caliper 1. Only the first spring abutment 21 is provided with the bolt 8 for locking the pad hold-down device 10 and the flat spring 12. The brake caliper 1, on the other hand, is provided with an aperture or recess 24 open toward the pad take-up 6 in order to form the second spring abutment 22, the recess at the same time affording space for the end of the pad hold-down device 10 and also for the spring end 32.

Figure 2:
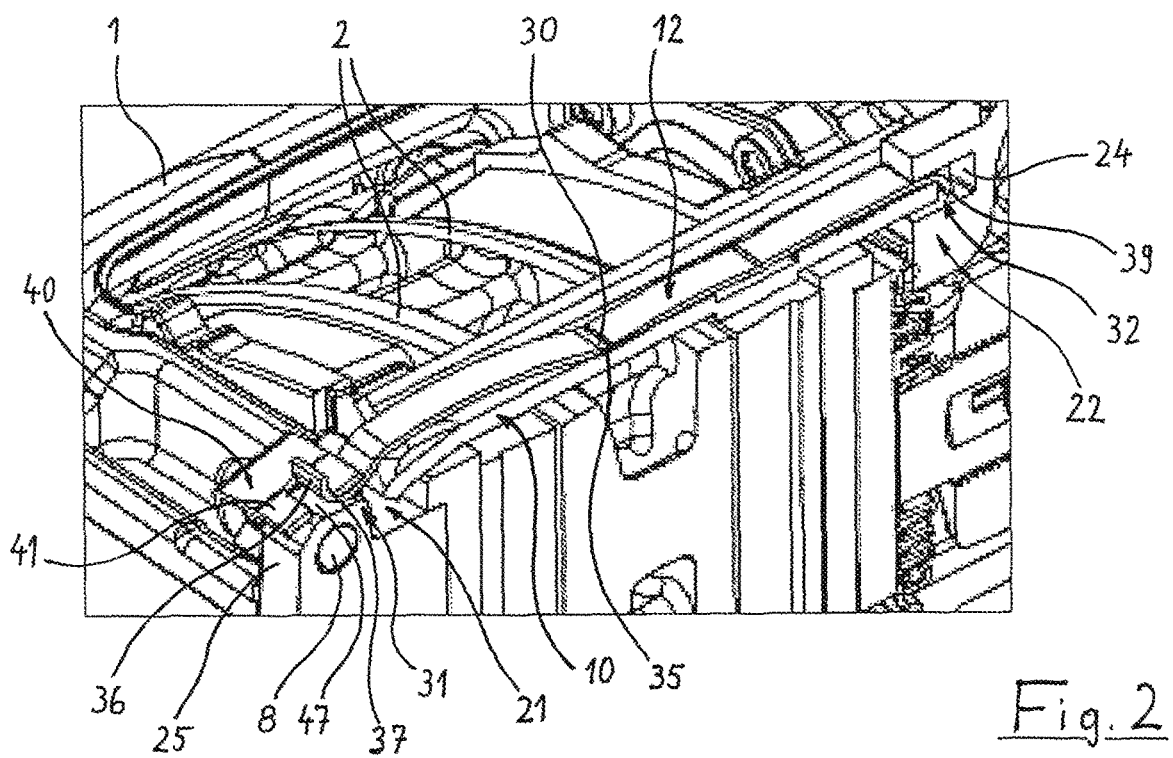
FIG. 2 the items in FIG. 1 in another perspective top view.

It is advantageous for assembling the arrangement comprising the pad hold-down device and the flat spring that the ends of these two components, inserted together into the aperture or recess 24 of the brake caliper in a longitudinal direction, are locked to one another. For this purpose, the pad hold-down device 10 is provided at this end 20 with an end face 23, behind which an interlocking element 39, formed on the corresponding spring end 32 of the flat spring, engages (FIG. 2). For this rear engagement, the flat spring 12 is bent substantially transversely at the spring end 32, wherein this bent portion, inside the aperture or recess 24, engages behind the end face 23 of the pad hold-down device 10. The locking action thereby achieved means that, as soon as the pad hold-down device 10 is situated in the aperture or recess 24 of the brake caliper, the flat spring 12 locks in a longitudinal direction, that is to say it is caught on the pad hold-down device 10. This measure facilitates the subsequent fixing of the pad hold-down device 10 and, above all, of the flat spring 12 at the other end, that is to say in the area of the first spring abutment 21.

Figure 5A:
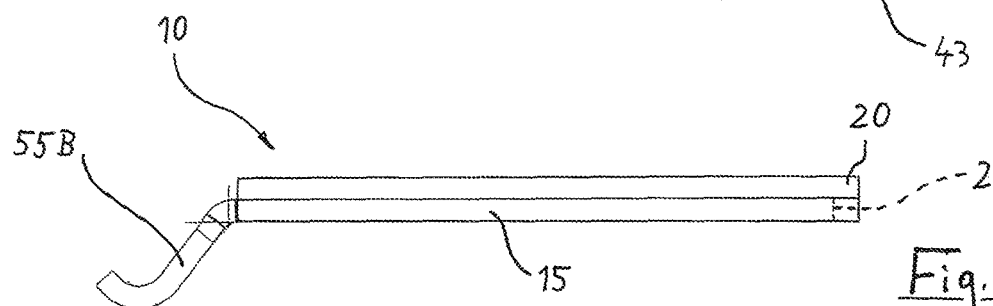
FIG. 5a a side view of just the pad hold-down device.
Figure 5B:
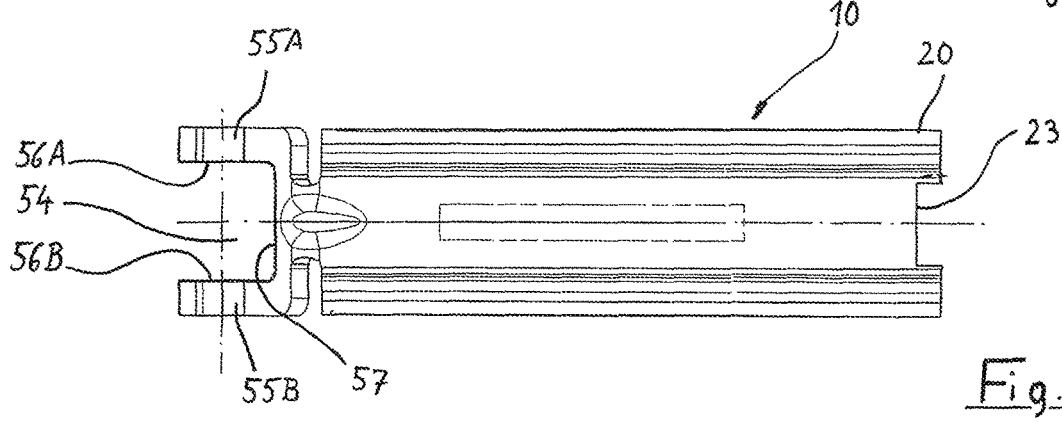
FIG. 5b a top view of the pad hold-down device.

In the area of the first spring abutment 21, the pad hold-down device 10, as shown in FIG. 5a, is cropped in that it has a bend at this end. With the bolt 8 fitted, this bend engages under the bolt 8, so that this end of the pad hold-down device is caught by the bolt and cannot then detach itself outward from the brake caliper 1, in the absence of the flat spring 12 or in case it fails.

A longitudinal locking action of the pad hold-down device 10 is also achieved in that the bent end portion thereof comprises two longitudinal portions 55A, 55B separated from one another by an open middle area 54. In the assembled state, the transverse edge 57 connecting the two longitudinal portions 55A, 55B is situated opposite a bearing bracket 25, which is solidly formed on the brake caliper 1 and which serves primarily to receive the bolt 8 and thereby the fastener. The longitudinal mobility of the pad hold-down device 10 is therefore limited in both directions, that is to say, on the one hand, by the transverse edge 57 abutting against the bearing bracket 25 and, on the other hand, by the other end of the pad hold-down device 10 abutting in the aperture or recess 24 of the brake caliper.

The bearing bracket 25 integrally formed on the brake caliper 1 comprises a hole through which to pass the bolt 8. With their mutually opposing inner sides 56A, 56B, the longitudinal portions 55A, 55B of the pad hold-down device 10 are turned towards the bearing bracket 25 in the longitudinal direction of the bolt, wherein the inner side 56A of the one longitudinal portion 55A is turned towards the bearing bracket 25 from the one side, and the inner side 56B of the other longitudinal portion 55B from the other. However, a certain mobility of the pad hold-down device 10 relative to the bearing bracket in a circumferential direction, i.e., in a rotational direction, is important.

Figure 3:
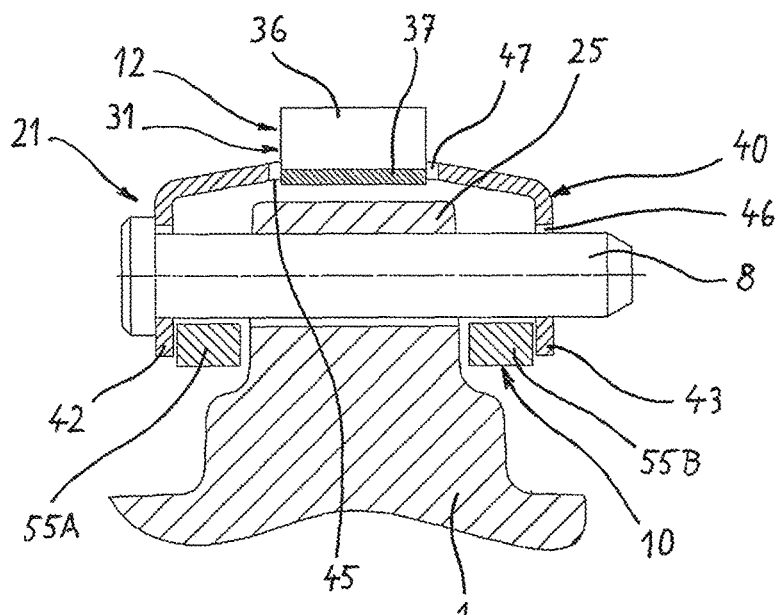
FIG. 3 a cross section through a hold-down assembly comprising a pad hold-down device, a flat spring, a clip, and a bolt fixed to the brake caliper.

According to FIG. 3, the bent longitudinal portions 55A, 55B of the pad hold-down device 10 comprise a certain distance from the cylindrical bolt 8 in the assembled state. On their underside remote from the bolt 8, they also comprise a distance from the opposing surface 27 of the brake caliper 1. The reason for this is that the pad hold-down device 10, precisely because of its hold-down function, is primarily supported on the two brake pads 3.

FIG. 3 also shows how the spring end 31 is arrested on the spring abutment 21. In addition to the bolt 8, a constituent part of this spring abutment 21 is a fastening clip 40, which is connected by the bolt 8 to the bearing bracket 25 of the brake caliper. The flat spring 12 bears with its spring end 31 against the inner side 45 of the clip 40 facing the bolt 8.

As an additional safeguard, an interlocking element 36 formed right at the end of the spring end 31 engages in a slot-shaped aperture 47 in the clip 40.

Figure 4:
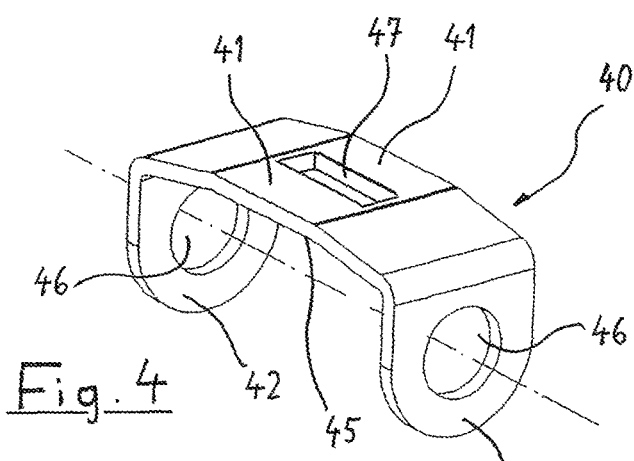
FIG. 4 a perspective representation of the clip.

According to FIG. 4 the clip 40 comprises a middle portion 41, against the inner side of which the spring end 31 bears, and two side portions 42, 43 arranged approximately at right angles in relation to the middle portion 41. The side portions 42, 43 of the clip 40 each comprise a circular aperture 46, through which the bolt 8 passes close to its bolt ends with little play.

The distance between the two side portions 42, 43 is preferably such that the one side portion 42 can be supported against the first bent longitudinal portion 55A, and the other side portion 43 against the second bent longitudinal portion 55B of the pad hold-down device 10 in the longitudinal direction of the bolt.

The bolt 8 serves as fastener for detachably fixing the clip 40 to the bearing bracket 25. At the same time, the flat spring 12 is supported under spring tension against the inner side 45 of the middle portion 41 of the clip 40 facing the bolt 8. All of these measures together serve to secure and maintain the flexural stress of the flat spring 12.

The positively interlocking engagement of the angled interlocking element 36, formed at the spring end 31, in the aperture 47 of the clip 40, which is situated in the middle portion 41, constitutes an additional safeguard.

The flat spring 12 is dished at the spring end 31, the outer side of this bend 37 in the assembled state facing the bolt 8.

The extreme outer end of the spring end 31 may also be designed as a taper, which in the assembled state forms the interlocking element for engagement in the aperture 47 of the clip 40. In this case the flat spring is significantly narrower in the area of the taper than in the area of the rest of the flat spring width.

The arrangement comprising the pad hold-down device 10, the flat spring 12, the clip 40, and the bolt 8 is assembled by first placing the flat spring 12 onto the pad hold-down device 10 so that, with its angled end forming an interlocking element 39, it engages behind the end of the pad hold-down device 10. Then, the thus provisionally connected parts are pushed in a longitudinal direction into the aperture or recess 24 of the brake caliper.

In a next step, the clip 40 is placed onto the spring end 31, which is simplified by the engagement of the angled end serving as interlocking element 36 in the aperture 47 of the clip 40 and, above all, is safer for the technician. Then the clip 40 is now depressed through manual pressure at its middle portion 41, bending the flat spring, until the apertures 46 in the side portions 42, 43 align with the hole in the bearing bracket 25 fixed to the brake caliper. Once they do, the bolt 8 is inserted in the bolt longitudinal direction. The pressure exerted on the clip 40 can then be terminated since the tensioning force of the flat spring 12 is now safely absorbed by the clip 40 in conjunction with the bolt 8.

In order that the bolt 8 cannot work loose again in the longitudinal direction of the bolt, suitable retaining rings, split pins or the like are provided on the bolt 8.

LIST OF REFERENCE NUMERALS 1 brake caliper
2 brake disc
3 brake pad
4 friction pad
5 pad back plate
6 pad take-up
7 recess
8 bolt, fastener
10 pad hold-down device
12 flat spring
15 bevel
20 end
21 spring abutment
22 spring abutment
23 end face
24 aperture, recess
25 bearing bracket
27 surface on the brake caliper
30 curvature, bend
31 spring end
32 spring end
36 interlocking element
37 bend
39 interlocking element
40 clip, fastening clip
41 middle portion
42 side portion
43 side portion
45 inner side
46 aperture
47 aperture
54 open middle area
55A longitudinal portion
55B longitudinal portion
56A inner side
56B inner side
57 transverse edge

What is claimed is:

1. A disc brake comprising:
   a brake disc;
   brake pads each comprising a pad back plate and mounted on opposite sides of the brake disc;
   a brake caliper engaging over the brake disc and the brake pads;
   a pad hold-down device securing the brake pads to prevent the brake pads from falling out of the disc brake, wherein the pad hold-down device bears against the pad back plates of the brake pads and extends transversely to the brake pads;
   a flat spring bearing resiliently against a side of the pad hold-down device facing away from the brake pads, wherein the flat spring extends in a longitudinal direction of the pad hold-down device and comprises a first spring end and a second spring end opposite the first spring end;
   a first spring abutment supporting the first spring end and a second spring abutment supporting the second spring end;
   wherein the first spring abutment comprises a fastener extending transversely to the pad hold-down device and transversely to the flat spring;
   wherein the first spring abutment further comprises a clip connected to the brake caliper by the fastener;
   wherein the first spring end bears against an inner side of the clip, the inner side of the clip facing the fastener.

2. The disc brake as claimed in claim 1, wherein the first spring end comprises an interlocking element configured to engage the clip.

3. The disc brake as claimed in claim 2, wherein the interlocking element extends substantially transversely to a main extent of the flat spring.

4. The disc brake as claimed in claim 2, wherein the first spring end comprises a bend comprising an outer curved side facing the fastener.

5. The disc brake as claimed in claim 1, wherein the second spring end comprises an interlocking element engaging behind the pad hold-down device in the longitudinal direction.

6. The disc brake as claimed in claim 1, wherein the flat spring bears resiliently against the pad hold-down device only at a single contact site over a longitudinal extent of the flat spring, wherein the flat spring at the single contact site comprises a curvature and an outer curvature side of the curvature bears against the pad hold-down device.

7. The disc brake as claimed in claim 1, wherein the clip comprises a middle portion and side portions arranged at opposed ends of the middle portion, wherein the side portions are angled relative to the middle portion, wherein the first spring end bears against the middle portion, and wherein the fastener passes through the side portions.

8. The disc brake as claimed in claim 7, wherein the side portions each comprise an aperture though which the fastener passes.

9. The disc brake as claimed in claim 7, wherein the middle portion comprises an aperture, wherein the first spring end comprises an interlocking element configured to engage the clip, wherein the interlocking element engages the aperture.

10. The disc brake as claimed in claim 1, wherein the brake caliper comprises an integrally formed bearing bracket, wherein the pad hold-down device, in the area of the first spring abutment, comprises two longitudinal portions that are separated from one another by an open middle area and comprise inner sides facing each other and facing the bearing bracket, wherein the fastener is detachably fixed to the bearing bracket.

11. The disc brake as claimed in claim 10, wherein the clip is supported against outer sides of the longitudinal portions, the outer sides of the longitudinal portions facing away from each other.

12. The disc brake as claimed in claim 1, wherein the fastener is a bolt.

* * * * *